March 12, 1940. A. SCHMIDT, JR 2,193,649
SYSTEM OF ELECTRICAL DISTRIBUTION
Filed June 21, 1939
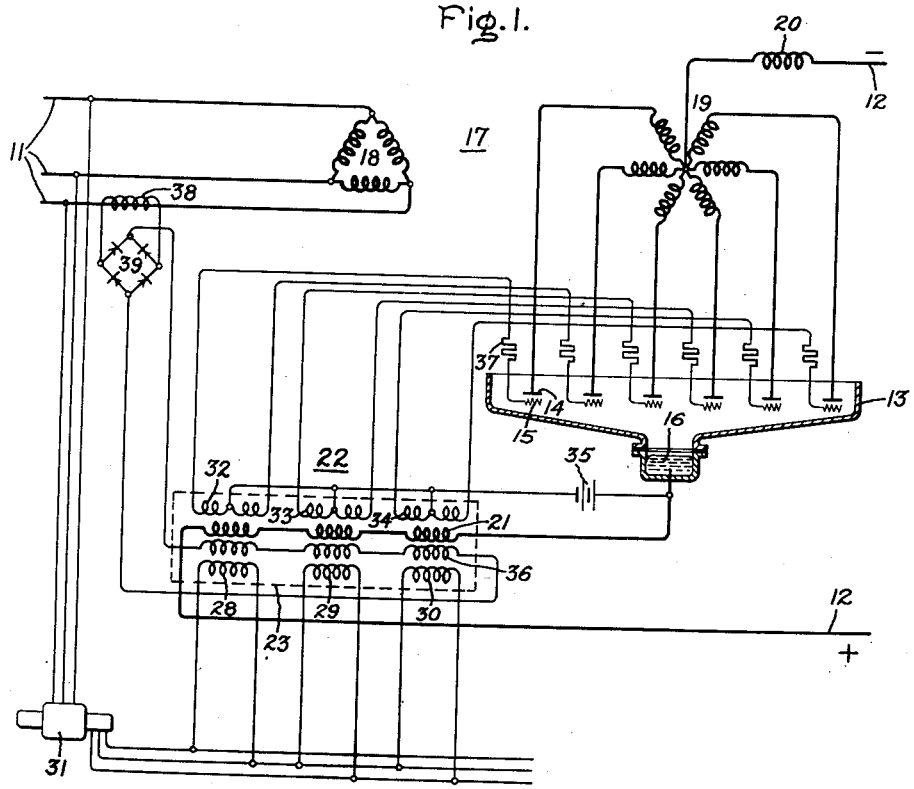
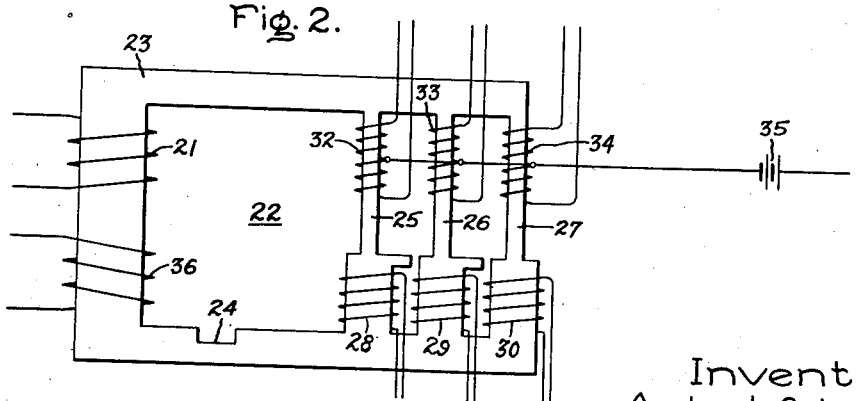
Inventor:
August Schmidt, Jr.
by Harry E. Dunham
His Attorney.

Patented Mar. 12, 1940

2,193,649

UNITED STATES PATENT OFFICE 2,193,649

SYSTEM OF ELECTRICAL DISTRIBUTION

August Schmidt, Jr., Niskayuna, N. Y., assignor to General Electric Company, a corporation of New York Application June 21, 1939, Serial No. 280,332

6 Claims. (Cl. 175—363)

My invention relates to systems of electrical distribution, and more particularly to such systems including electric valves for transmitting energy between alternating and direct current circuits.

Electric valve converting systems have recently become much more important for supplying power to metropolitan areas and the like. In this type of installation continuity of service is often so important that no overload protective apparatus is used. It would frequently be desirable, therefore, to provide an arrangement whereby the power output of such electric valve apparatus may be limited to some predetermined maximum value without interfering with continuity of service. Heretofore, when it has been desirable to limit the output of the electric valve converters it has been necessary to employ apparatus which has been complicated in construction and arrangement and which has been of inordinate proportions relative to the size and rating of the equipment controlled. In view of these facts, it has become apparent that there is a decided need for apparatus capable of performing the above-mentioned function in a precise and reliable manner without involving expensive or complicated equipment.

It is an object of my invention, therefore, to provide a new and improved electric control circuit for electric valve converting apparatus.

It is another object of my invention to provide an improved system of electrical distribution including an electric valve suitable for transmitting energy between alternating current and direct current circuits with a simple means for limiting the power output of the electric valve to some predetermined maximum value.

Still another object of my invention is to provide an improved power limiting means for grid-controlled rectifiers.

Further objects and advantages of my invention will become apparent as the following description proceeds and the features of novelty which characterize my invention will be pointed out with particularity in the claims annexed to and forming a part of this specification.

In acccordance with the illustrated embodiment of my invention I provide an electric valve converting apparatus interconnecting an alternating current supply circuit and a direct current load circuit. An inductive device supplies an alternating voltage of peaked wave form to the grids or control electrodes of the electric valve converting apparatus. The phase of the alternating voltage of peaked wave form is controllable relative to a predetermined alternating voltage source by means of a pair of saturating windings mounted on the inductive device. The load current passes through one of these saturating windings while a direct current proportional to the alternating current supply passes in opposite direction through the second of these saturating windings. These windings impress unidirectional magnetomotive forces which normally neutralize one another and the resultant of these magnetomotive forces determines the phase of the alternating voltage of peaked wave form relative to the voltage source. When a predetermined maximum load is placed upon the electric valve converting apparatus the resultant of the two magnetomotive forces is such as to retard the phase excitation of said control electrode and hence limit the output of the electric valve apparatus to a definite predetermined maximum value.

For a better understanding of my invention, reference may be had to the following description taken in connection with the accompanying drawing and its scope will be pointed out in the appended claims.

In the drawing, Fig. 1 illustrates an embodiment of my invention for transmitting energy from a three-phase alternating current supply circuit to a direct current load circuit, while Fig. 2 more specifically discloses the details of the inductive device used in the embodiment of my invention illustrated in Fig. 1.

Referring now to the drawing, there is illustrated an electric distribution system embodying my invention for transmitting energy between an alternating current circuit 11 and a direct current circuit 12 through electric valve means 13. By way of example, I have illustrated a plurality of electric valves combined in a single vapor electric device provided with a plurality of anodes 14, control electrodes or grids 15, and a single cathode 16, although it will be apparent to those skilled in the art that electric valves of any of the several types well known in the art, for example separate valves including anodes 14 enclosed in separate containers may be used. A transformer 17 is interposed between the electric valve means 13 and the alternating current circuit 11 and impresses alternating voltages on the respective anodes 14 thereof. This transformer comprises primary winding 18 and a star-connected secondary winding 19. The terminals of the star-connected winding are connected respectively to the anodes 14, while the neutral of the star-connected secondary winding 19 is connected through a suitable smoothing reactor 20 to one side of the direct current load circuit 12. The other side of the direct current circuit 12 is connected through an inductive winding 21 to the cathode 16. The purpose of winding 21 will be hereinafter described.

As a means for impressing on the control members or grids 15 of electric valve apparatus 13 alternating voltages of peaked wave form, the phase relation of which with respect to the voltages applied to the anodes 14 may be varied when certain predetermined conditions occur, I provide an impulse transformer 22. The structural features of this transformer are shown in greater detail in Fig. 2. As illustrated transformer 22 includes a core member 23 having a restricted saturable portion 24 and a plurality of saturable parallel flux paths 25, 26 and 27. The restricted section 24 limits the amount of unidirectional magnetomotive force impressed on the saturable flux paths 25, 26 and 27. To impress on each of the saturable paths 25, 26 and 27 an alternating magnetomotive force I employ windings 28, 29 and 30, respectively, which are energized from any suitable three-phase source of alternating current of proper phase and frequency. In the arrangement of Fig. 1 these windings are shown as being energized from the alternating current circuit 11 through any conventional phase shifting arrangement such as the rotary phase shifter 31. I provide windings 32, 33 and 34 associated with saturable paths 25, 26 and 27, respectively, which serve to impress on control members 15 of electric valve means 13 alternating voltages of peaked wave form, the phase positions of which relative to the voltages impressed on anodes 14 are controllable in accordance with the unidirectional flux in the core member 23. The windings 32, 33 and 34 have midpoint taps which are connected together to the cathode 16. A negative biasing potential is impressed on control members 15 of electric valve 13 by any suitable means such as a battery 35 and current limiting resistors 37 connected in series relation with the control members 15 and the associated windings 32, 33 and 34.

The saturating winding 21 connected in the direct current load circuit impresses on the core member 23 a unidirectional magnetomotive force which varies directly in accordance with variations of the load current. A second saturating or control winding 36 which is oppositely disposed relative to winding 21 impresses on the core member 23 a unidirectional magnetomotive force in opposition to the unidirectional magnetomotive force of winding 21 and serves to control the net amount of unidirectional flux in the core member 23 and hence serves to control the phase of the alternating voltages of peaked wave form induced in windings 32, 33 and 34. Control winding 36 is supplied with direct current from the output of a small rectifying device 39 which may be any of the well known types as for example, a copper oxide rectifier. Rectifier 39 derives energy from the secondary of a current transformer 38 placed in one of the alternating supply lines 11. This current transformer 38 is so designed that it becomes saturated at some current corresponding to the maximum load which it is desired to carry through electric valve apparatus 13 and after this current value is reached its output will not increase as the load on the electric valve apparatus 13 increases. With normal operation the net magnetomotive force impressed by windings 36 and 21 on transformer core 23 is zero, that is, there is no resultant magnetomotive force tending to cause a phase shift of the grid potential. When, however, the load carried by electric valve apparatus 13 increases to some predetermined maximum value the alternating current flowing in supply lines 11 correspondingly increases. Current transformer 38 is so designed that at a value of the alternating supply current 11 corresponding to the maximum desired power output of the electric valve apparatus 13 the transformer 38 will become saturated and hence the magnetomotive force impressed by winding 36 will no longer increase in direct proportion to the increase of load on electric valve apparatus 13. Furthermore, this magnetomotive force impressed by winding 36 will then no longer neutralize the magnetomotive force impressed by winding 21 and the resultant unidirectional magnetomotive force in core 23 will tend to cause a retardation of the phase excitation of grids 15 of the electric valve apparatus 13 with respect to the phase of the voltage applied to anodes 14. Thereby the output of electric valve apparatus 13 is effectively limited to a predetermined maximum value.

The operation of the embodiment of my invention diagrammatically shown in Fig. 1 will be explained by considering first the electric translating system when the energy being carried by the electric valve apparatus 13 is less than a predetermined maximum value and when energy is being transmitted from alternating current circuit 11 to the direct current circuit 12 through transformer 17 and electric valve means 13. It will be understood by those skilled in the art that the electric valve means 13 will conduct current to supply the direct current circuit 12 with current at a predetermined voltage which depends on the phase relationship between the voltage impressed on the control members 15 and the voltage impressed on the anodes 14. When there is a substantial phase opposition between the voltages impressed on the control members 15 and the voltage on the associated anodes 14 the voltage impressed on the circuit 12 by electric valve means 13 will be substantially zero and when there is a substantial phase coincidence between the voltages impressed on the control members 15 and the voltages impressed on the associated anodes 14 the voltage impressed on circuit 12 by electric valve 13 will be a maximum. The inductive device or impulse transformer 22 provides an alternating potential of peaked wave form due to the design of the core member 23. The saturable paths 25, 26 and 27 are designed to become saturated at a value of voltage impressed on the windings 28, 29 and 30 which is substantially less than the maximum value of the alternating voltage impressed, so that the flux in the saturable paths 25, 26 and 27 remains substantially constant during the greater portion of each half cycle of alternating voltage. By this design of core member 23 voltage impulses or alternating potentials of peaked wave form are induced in windings 32, 33 and 34. The shift in phase of this voltage induced in windings 32, 33 and 34 relative to the voltage impressed upon anodes 14 by transformer 17 is effected by controlling the resultant unidirectional flux in the core member 23. The current flowing in alternating current supply lines 11 is related directly to the current flowing in the load circuit 12. Current transformer 38 and saturating windings 21 and 36 are so designed that at all values of power output of electric valve apparatus 13 up to some predetermined maximum value the resultant unidirectional flux impressed in the core member 23 is zero and therefore with normal operation of the electric valve converting apparatus there is no shift in phase of the alternating voltage of peaked wave form impressed on grids 15 relative to the alternating voltage impressed on anodes 14 by transformer 17. When, however, the output of electric valve apparatus 13 increases to such a value corresponding to a desired predetermined maximum, then the current flowing in alternating current supply lines 11 has attained such a value as to cause saturation of the current transformer 38. The unidirectional current derived from rectifier 39 no longer increases in proportion to the increase of current flowing in alternating supply lines 11. The magnetomotive force impressed on core member 23 of inductive device 22 by winding 36 no longer completely neutralizes the magnetomotive force impressed by winding 21 and there remains a resultant unidirectional flux in the core member 23. This unidirectional flux is in such a direction as to retard the phase excitation of control member 15 with respect to the phase of the voltages impressed on anodes 14 by transformer 17. The output of electric valve apparatus 13 will therefore be effectively limited to some predetermined maximum value.

While I have shown and described my invention as applied to a particular system of connections and as embodying various devices diagrammatically shown, it will be obvious to those skilled in the art that changes and modificatons may be made without departing from my invention and I, therefore, aim in the appended claims to cover all such changes and modifications as fall within the direct spirit and scope of my invention.

What I claim as new and desire to secure by Letters Patent of the United States is:

1. In a system of distribution, an alternating current supply circuit, a direct current load circuit, means for transmitting energy therebetween including an electric valve provided with a control grid, a transformer for supplying a potential of peaked wave form to said control grid, said transformer comprising a core and a pair of unidirectional saturating windings so constructed and arranged as normally to impress neutralizing unidirectional magnetomotive forces on said transformer core, one of said saturating windings being connected in said direct current load circuit and tending to retard the phase excitation of said grid potential, a current transformer in said alternating current supply circuit and rectifying means connected to said current transformer for supplying a direct current to the second of said saturating windings, said current transformer being constructed and arranged to become saturated at a value of said alternating supply current corresponding to a predetermined maximum output of said electric valve so that the magnetomotive force impressed by said second saturating winding no longer neutralizes the magnetomotive force impressed by said first saturating winding and the phase of said grid potential is thereby retarded to limit the power output of said electric valve.

2. In a system of distribution, an alternating current supply circuit, a unidirectional load circuit, an electric valve interconnecting said circuits for transmitting energy therebetween, means for controlling the conductivity of said valve including an impulse transformer, means for limiting the load on said electric valve to a predetermined maximum comprising means tending to saturate said transformer in response to the unidirectional load current, and means responsive to the curent flowing in said alternating current supply circuit for opposing the saturating tendency of said last mentioned means, said opposing means normally neutralizing the effect of said saturating means but ineffective to neutralize the effect of said saturating means when said load current reaches a predetermined value so that the power output of said electric valve is effectively limited.

3. In combination, an alternating current supply circuit, a direct current load circuit, electric valve means having a control member interposed between said circuits for transmitting energy therebetween, means for limiting the power output of said electric valve means to a predetermined maximum comprising an impulse transformer provided with a core and including a primary winding energized with alternating current which causes saturation of said core for the major portion of the alternating current cycle, a secondary winding for supplying voltage of peaked wave form to said control member, a unidirectional saturating winding on said core through which the load current flows and so constructed and arranged as to tend to retard the excitation of said control member in response to increase of load current, a unidirectional desaturating winding on said core for neutralizing up to a predetermined maximum the magnetomotive force impressed by the flow of load current in said saturating winding but thereafter allowing said saturating winding to retard the excitation of said control member so that the power output of said electric valve is limited to a definite maximum value.

4. In an electric valve converting system, the combination of an alternating current supply circuit, a direct current load circuit and an electric valve means comprising an anode, a cathode and a control electrode interconnecting said circuits, a transformer including a core for supplying voltage of peaked wave form to said control electrode, a pair of unidirectional saturating windings on said transformer for impressing opposing normally equal magnetomotive forces on said core, the first of said saturating windings being connected to carry the load current, the second of said windings being supplied from the alternating current circuit through a normally unsaturated curent transformer and rectifier means, said current transformer being constructed and arranged to become saturated at a predetermined maximum value of said alternating current supply so that said first saturating winding retards the excitation of said control electrode and limits the power output of said electric valve to a predetermined maximum value.

5. In a system of distribution, an alternating current supply circuit, a direct current load circuit, means for transmitting energy therebetween including an electric valve provided with a control grid, an impulse transformer adapted to supply potential of peaked wave form to said control grid, a saturating winding on said impulse transformer through which the load current flows tending to retard the phase excitation of said grid potential with respect to the phase of said alternating current supply circuit, means for deriving from said alternating current supply circuit a unidirectional desaturating current for said impulse transformer tending to oppose said phase retardation of said grid potential, said desaturating current normally neutralizing the effect of the current flowing in said saturating winding, but arranged to be ineffective to effect such neutralization when said load current reaches a predetermined maximum value so that the output of said electric valve apparatus is effectively limited.

6. In a system of distribution, an alternating current supply circuit, a direct current load circuit, an electric valve interconnecting said circuits for transmitting energy therebetween, means for controlling the conductivity of said valve including impulse transformer means provided with a core and adapted to be saturated by alternating current over the major portion of the alternating current cycle, a unidirectional current winding on said impulse transformer for saturating said core in response to the direct current load and a second unidirectional current winding for differentially saturating said core in response to the current flowing in said alternating current supply circuit, said differential saturating means normally neutralizing the effect of said saturating means but arranged so that at a predetermined maximum load said saturating means becomes effective and limits the power output of said electric valve.

AUGUST SCHMIDT, Jr.